(12) United States Patent
Sasaki

(10) Patent No.: US 6,334,820 B1
(45) Date of Patent: Jan. 1, 2002

(54) SOLID GOLF BALL

(75) Inventor: Takashi Sasaki, Akashi (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 09/457,362

(22) Filed: Dec. 9, 1999

(30) Foreign Application Priority Data

Dec. 24, 1998 (JP) .............................. 10-367615

(51) Int. Cl.$^7$ ................................ A63B 37/06
(52) U.S. Cl. ........................... 473/374; 525/93
(58) Field of Search ........................ 473/374, 373, 473/378, 376, 377, 370; 525/93

(56) References Cited

U.S. PATENT DOCUMENTS

| | | | |
|---|---|---|---|
| 4,431,193 A | | 2/1984 | Nesbitt |
| 5,693,711 A | * | 12/1997 | Akiba et al. .................. 525/93 |
| 5,935,022 A | * | 8/1999 | Sugimoto et al. ............ 473/373 |
| 5,948,862 A | * | 9/1999 | Sano et al. ................... 473/373 |
| 5,957,784 A | * | 9/1999 | Asukura et al. ............. 473/374 |

FOREIGN PATENT DOCUMENTS

| | | |
|---|---|---|
| JP | 5892372 | 6/1983 |
| JP | 9010357 | 1/1997 |

* cited by examiner

Primary Examiner—Mark S. Graham
Assistant Examiner—Raeann Gorden

(57) ABSTRACT

The present invention provides a solid golf ball having the improved shot feeling without damaging the durability and good carry. The solid golf ball has an intermediate layer between a core and a cover layer. The intermediate layer is a cured body of a thermoplastic resin composition including components (a) and (b). The component (a) is selected from a group consisting of a first block copolymer including at least one polymer block A of an aromatic vinyl compound and at least one polymer block B of a conjugated diene compound, and a second block copolymer obtained by hydrogenating said first block copolymer. The component (b) consisting of ionomer.

11 Claims, 1 Drawing Sheet

SOLID GOLF BALL

BACKGROUND OF THE INVENTION

1. Field of the Invention

The present invention relates to a solid golf ball having an intermediate layer between a core and a cover layer, and more specifically, to a solid golf ball having the excellent flying performance and improved shot feeling.

2. Description of the Related Art

There are two types of golf balls generally used. The first type is a thread-wound golf ball provided by winding rubber threads upon a solid rubber ball (solid core) or a rubber bag filled with a liquid (liquid core) and covering the thread-wound core with balata or another rubber-like substance. The second type is a solid golf ball, for example, a two-piece golf ball provided by covering a rubber core with an ionomer or another synthetic resin.

The thread-wound golf ball has excellent control performance and shot feeling but poor durability. The two-piece golf ball has excellent durability and flying performance and becomes the main stream of the solid golf ball. The two-piece golf ball is, however, harder and thereby causes a golfer to have a greater impact on a shot than the thread-wound golf ball. Namely the disadvantage of the two-piece golf ball is poor shot feeling. An improvement in shot feeling is demanded because the muscleless people feel difficulty in shot.

Lowering the hardness of the two-piece golf ball to improve the shot feeling decreases the resilience and damages the good carry, which is the advantage of the two-piece golf ball.

One proposed golf ball has a core made of a rubber composition containing an organic sulfur compound, in order to improve the shot feeling without damaging the resilience and the flying performance of the solid golf ball.

There is, however, a good requirement for further improved golf balls having the long flying distance and the excellent roll-stopping performance. Three-piece golf balls, which have an intermediate layer between a core and a cover layer, have accordingly been proposed to meet the requirement.

One proposed three-piece golf ball has an intermediate layer made of hard/rigid ionomer resin, which has high hardness and flexural modulus, and a cover layer made of soft/flexible ionomer resin, which has low hardness and flexural modulus, as disclosed in Japanese Unexamined Patent Publication No. 58-92372. This arrangement enables the hard intermediate layer having high resilience to compensate for the decrease in resilience due to the soft ionomer cover. The hard intermediate layer, however, leads to the poor shot feeling.

Another proposed three-piece golf ball has an intermediate layer made of a mixture of a hard ionomer (i.e. rigid ionomer) and a soft ionomer (i.e. flexible ionomer), so as to lower the hardness of the intermediate layer as disclosed in Japanese Unexamined Patent Publication No. 9-10357. The lowered hardness of the intermediate layer containing the soft ionomer, however, undesirably lowers the resilience of the resulting ball. Increasing the content of the soft ionomer to lower the hardness of the intermediate layer and attain the satisfactory shot feeling results in the insufficient flying distance.

SUMMARY OF THE INVENTION

An object of the present invention is thus to provide an improved solid golf ball having the improved shot feeling without damaging the excellent durability and carry, which are the advantages of the conventional solid golf ball.

The present inventors have found that a solid golf ball having an intermediate layer made of a thermoplastic resin composition including a specific block copolymer and an ionomer has excellent resilience and flying performances and good shot feeling, thus completing the present invention.

The present invention is directed to a solid golf ball having an intermediate layer between a core and a cover layer. The intermediate layer comprises a thermoplastic resin composition including polymer components (a) and (b). The component (a) is one or more selected from the group consisting of a first block copolymer which includes at least one polymer block A of an aromatic vinyl compound and at least one polymer block B of a conjugated diene compound, and a second block copolymer obtained by hydrogenating the first block copolymer. The component (b) consists of ionomers.

These and other objects, features, aspects, and advantages of the present invention will become more apparent from the following detailed description of the preferred embodiments/examples with the accompanying drawings.

DESCRIPTION OF THE PREFERRED EMBODIMENTS

Figure 1:
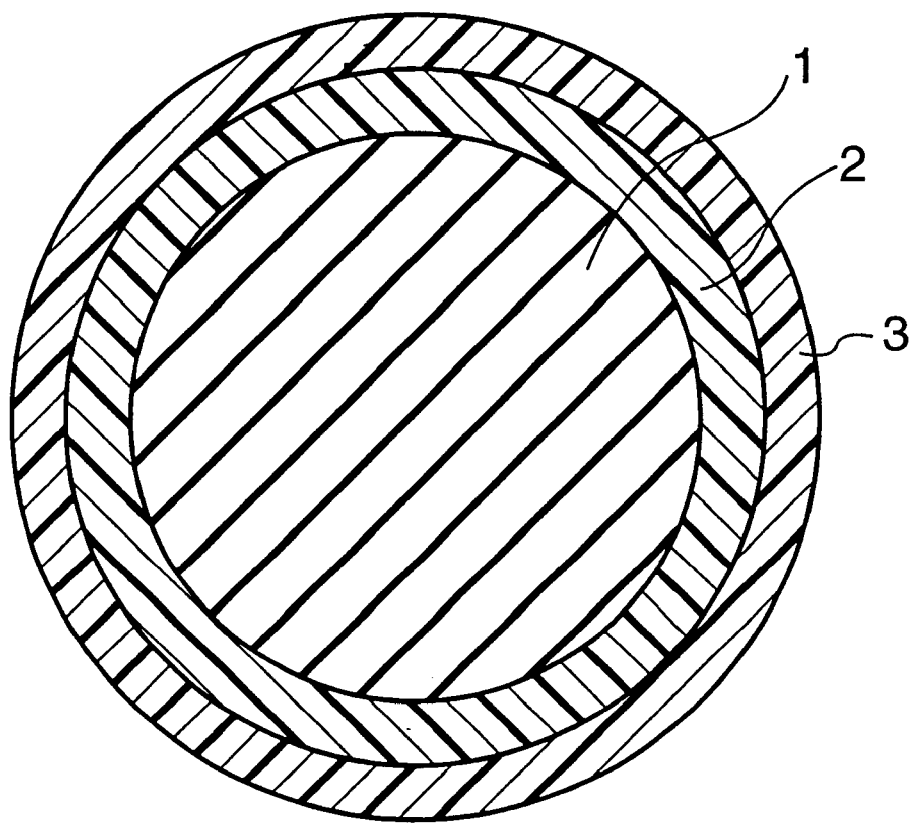
FIG. 1 schematically illustrates the structure of a three-piece solid golf ball.

A solid golf ball according to the present invention basically has a three-layer structure having an intermediate layer 2 between a core 1 and a cover layer 3 as shown in FIG. 1.

The respective constituents of the solid golf ball of the invention are described in detail.

The core 1 is preferably made of vulcanized rubber compositions containing a base rubber, an $\alpha,\beta$-unsaturated carboxylic acid and or metal salt thereof, and an organic peroxide, but are not limited thereto.

As the base rubber, natural rubber or synthetic rubber which have been conventionally used for the core of the solid golf ball, is used. Typical examples of the synthetic rubber include ethylene/propylene/diene terpolymer (EPDM), butadiene rubber (BR), isoprene rubber (IR), styrene—butadiene rubber (SBR), and acrylonitrile-butadiene rubber (NBR). A mixture of two or more such rubbers may be used as the base rubber. A preferable example is high cis-1,4-polybutadiene rubber containing not less than 40% or preferably not less than 80% of the cis-1,4-bond.

The $\alpha,\beta$-unsaturated carboxylic acid or a metal salt thereof is used as the co-crosslinking agent for vulcanization of the base rubber. Any of $\alpha,\beta$-unsaturated carboxylic acids containing 3 to 8 carbon atoms, such as acrylic acid and methacrylic acid, and monovalent and divalent metal salts thereof, such as zinc and magnesium salts, may be used. Among these available examples, zinc acrylate having the high resilience is preferably used. The amount of the metal salt of an unsaturated carboxylic acid is preferably 15 to 30 parts by weight or more preferably 20 to 30 parts by weight per 100 parts by weight of the base rubber. The amount of greater than 30 parts by weight makes the crosslinked structure dense and excessively hard, which leads to the poor shot feeling. The amount of less than 15 parts by weight, on the other hand, does not assure the sufficient resilience, which is the advantage of the solid golf ball.

The organic peroxide is used as a crosslinking initiator. Specific examples of the organic peroxide include dicumyl peroxide, 1,1-bis(t-butylperoxy)-3,5-trimethylcyclohexane, 2,5-dimethyl-2,5-di(t-butylperoxy)hexane, and di-t-butylperoxide. Among these available examples, dicumyl peroxide is preferably used. The amount of the organic peroxide is preferably 0.3 to 5.0 parts by weight or more preferably 0.5 to 3.0 parts by weight per 100 parts by weight of the base rubber.

Fillers may further be added to the rubber composition for the core, in addition to the above essential components. Examples of the fillers include metal salts, such as zinc oxide, barium sulfate, and calcium carbonate, and high specific gravity metal powders, such as tungsten powder and molybdenum powder. The preferable range of the amount of the fillers is 10 to 50 parts by weight per 100 parts by weight of the base rubber.

Other additives such as antioxidants, plasticizers, dispersants, ultraviolet absorbers, colorants and peptizers, which are generally used for the core of the solid golf ball, may be mixed appropriately according to the requirements. The preferable range of the amount of the antioxidant, if added, is 0.2 to 0.5 parts by weight per 100 parts by weight of the base rubber.

An organic sulfide such as diphenyl disulfide may be added to the rubber composition, in order to attain the sufficient resilience without damaging the good shot feeling.

The diameter of the core preferably ranges from 32 to 38 mm. In order to attain the desired shot feeling, the deformation amount of the core is preferably 3.0 to 6.0 mm or more preferably 3.8 to 5.0 mm when applied with a load from 10 kgf as an initial load to 130 kgf as a final load.

As far as the above conditions are fulfilled, the core may be a one-piece core composed of one specific rubber composition or a multi-piece core including plural layers of different rubber compositions.

The following describes the details of the intermediate layer 2.

The intermediate layer 2 is made of a thermoplastic resin composition containing polymer components (a) and (b).

The component (a) is a block copolymer which includes at least one polymer block A of vinyl compounds and at least one polymer block B of conjugated diene compounds (hereinafter may be referred to the 'first block copolymer'), or a hydrogenated block copolymer obtained by hydrogenating the first block copolymer (hereinafter may be referred to the 'second block copolymer'). The component (b) consists of ionomers.

First, the component (a) is discussed in detail.

The component (a) includes a polymer block A as a hard segment and a polymer block B as a soft segment, which are combined with each other in a linear configuration (A—B form, A—B—A form, multi-block form), a branched configuration (T form or star form), or in any arbitrary combination thereof.

The polymer block A is a polymer formed by polymerizing an aromatic vinyl compound, such as styrene, α-methylstyrene, 4-propylstyrene, 1,3-dimethylstyrene, vinylnaphthalene, or vinylanthracene. A homopolymer block is preferable for the enhanced crystallinity, and polystyrene and poly(α-methylstyrene) are especially preferable. In the case where the component (a) has a plurality of the polymer blocks A, two or more different polymer blocks A may be included. The content of the polymer block A in the component (a) is preferably 5 to 75% by weight or more preferably 10 to 65% by weight.

The polymer block B is a polymer formed by polymerizing one or more conjugated diene compounds, such as butadiene, isoprene, 2,3-dimethyl-1,3-butadiene, 1,3-pentadiene, and 1,3-hexadiene. The polybutadiene block may be a 1,4-bond structure, a 1,2-bond structure, or a mixture of 1,4-bond structure and 1,2-bond structure. Among these available examples, a 1,2-bond structure-rich polybutadiene block and a random copolymer block of isoprene and butadiene are preferable. In the case where the component (a) has a plurality of the polymer blocks B, two or more different polymer blocks B may be included. The micro-structure of the polymer block B, especially, the content of the double bond, is not specifically restricted.

The hydrogenated block copolymer (i.e. second block copolymer) is obtained by hydrogenating the first block copolymer, mainly the polymer block B of the first block copolymer. The hydrogenated polymer block B may be a polyethylene block or an ethylene-propylene random copolymer block. This is because polybutadiene block and a random copolymer block of isoprene and butadiene are preferably used as the polymer block B of the first block copolymer before hydrogenating.

The hydrogenated polymer block B is required to be non-crystalline polymer block in order to function as a soft segment in the component (a). The preferable examples of hydrogenated polymer block B are random copolymer having two or four continuous bonds of butadiene or a 1,2-bond structure-containing or 1,2-bond structure-rich polybutadiene.

The component (a) having the above structure is classified into a thermoplastic elastomer which has more flexibility than a hard ionomer but has more excellent elasticity and resilience than a soft ionomer. The intermediate layer composed of the resin composition including the component (a) accordingly has a relatively low hardness without lowering the resilience. Namely the resulting golf ball has improved shot feeling without damaging the flying distance.

It is further preferable that the component (a) has an OH group bonded to its molecular terminal. The block copolymer having an OH group bonded to its molecular terminal is more flexible than the block copolymer without an OH group, but has higher breaking strength, breaking extension, and resilience. Using the component (a) having an OH group on its molecular terminal enables the intermediate layer 2 to be more flexible and have higher resilience, thereby satisfying the two contradictory requirements of the excellent flying performance and good shot feeling.

The hydroxyl group may be added to the polymer block A or the polymer block B. The hydroxyl group is preferably added to the terminal of the polymer block A or more preferably added to the terminal of the polystyrene block. Preferable examples of the component (a) include polystyrene block—polybutadiene block—polystyrene block—OH, polystyrene block—polyisoprene block—polystyrene block—OH, polystyrene block—butadiene/isoprene random copolymer block—polystyrene block—OH, and their hydrogenated substances. Especially preferable are hydrogenated block copolymer of polystyrene block—butadiene/isoprene random copolymer block—polystyrene block—OH and polystyrene block—polyisoprene block—polystyrene block—OH.

The content of the hydroxyl group in the component (a) is preferably not less than 0.5 or more preferably not less than 0.6 per one molecule of the block copolymer.

The number-average molecular weight of the component (a) used in the present invention is not specifically restricted, but is preferably 30,000 to 1,000,000 or more preferably 40,000 to 300,000.

Block copolymers discussed above may be used individually or in combination with one another in the thermoplastic resin composition for the intermediate layer 2.

The component (b) is discussed in detail.

The ionomer constituting the component (b) is not specifically restricted, but a copolymer of an α-olefin and an α,β-unsaturated carboxylic acid neutralized with a metal ion is preferably used. Neither the content of the unsaturated carboxylic acid nor the degree of neutralization is specifically restricted in the ionomer. The metal ion that neutralizes the copolymer may be a monovalent metal ion, such as sodium, potassium, or lithium, a divalent metal ion, such as zinc, calcium, magnesium, copper, or manganese, or a trivalent metal ion, such as aluminum or neodymium. Among these available examples, using the sodium ion, the lithium ion, the magnesium ion, or the zinc ion for neutralization generally gives a hard ionomer having high hardness and resilience.

According to the present invention, the high-resilience ionomer, or hard ionomer, is thus preferably used for the component (b). Preferred is the hard ionomer having a flexural modulus of not less than 150 MPa and a Shore D hardness of not less than 57, and more preferred is the harder ionomer having a flexural modulus of not less than 200 MPa and a Shore D hardness of not less than 60. Such a hard/rigid ionomer provides the ball increasing in resilience while the component (a) lowers the hardness of the intermediate layer 2 in order to improve the shot feeling.

Specific examples of the hard ionomer used in the present invention include HIMILAN 1605 (the trade name of an ionomer resin composed of ethylene/methacrylic acid copolymer neutralized with sodium ion), HIMILAN 1707 (the trade name of an ionomer resin composed of ethylene/methacrylic acid copolymer neutralized with sodium ion), HIMILAN 1706 (the trade name of an ionomer resin composed of ethylene/methacrylic acid copolymer neutralized with zinc ion), HIMILAN AM 7315 (the trade name of an ionomer resin composed of ethylene/lmethacry lic acid copolymer neutralized with zinc ion), HIMILAN AM 7317 (the trade name of an ionomer resin composed of ethylene/ methacrylic acid copolymer neutralized with zinc ion), HIMILAN 1555 (the trade name of an ionomer resin composed of ethylene/methacrylic acid copolymer neutralized with sodium ion), HIMILAN 1557 (the trade name of an ionomer resin composed of ethylene/methacrylic acid copolymer neutralized with zinc ion), HIMILAN AM 7311 (the trade name of an ionomer resin composed of ethylene/ methacrylic acid copolymer neutralized with magnesium ion), and HIMILAN MK 7320 (the trade name of an ionomer resin composed of ethylene/methacrylic acid copolymer neutralized with potassium ion), which are all manufactured by Mitsui Du Pont Polychemical Co., Ltd. Available examples further include IOTEC 8000 (the trade name of an ionomer resin composed of ethylene/acrylic acid copolymer neutralized with sodium ion) and IOTEC 7010 (the trade name of an ionomer resin composed of ethylene/ acrylic acid copolymer neutralized with zinc ion), which are manufactured by Exxon Chemical Co., Ltd. Other available examples include SURLYN 7930 (the trade name of an ionomer resin composed of ethylene/methacrylic acid copolymer neutralized with lithium ion), SURLYN 9945 (the trade name of an ionomer resin composed of ethylene/ methacrylic acid copolymer neutralized with zinc ion), SURLYN 8945 (the trade name of an ionomer resin composed of ethylene/methacrylic acid copolymer neutralized with sodium ion), SURLYN 8920 (the trade name of an ionomer resin composed of ethylene/methacrylic acid copolymer neutralized with sodium ion), SURLYN 8940 (the trade name of an ionomer resin composed of ethylene/ methacrylic acid copolymer neutralized with sodium ion), and SURLYN 7940 (the trade name of an ionomer resin composed of ethylene/methacrylic acid copolymer neutralized with lithium ion), which are all manufactured by Du Pont Co., Ltd. The rigid ionomer used in the present invention may be a mixture of two or more ionomers listed above.

The soft/flexible ionomer may be mixed with the hard/ rigid ionomer for the component (b). The soft ionomer is generally a terpolymer with a portion of the carboxylic acid groups neutralized with metal ion. The terpolymer contains three types of monomers, namely 2 to 8 carbon atom-containing olefin, unsaturated carboxylic acid (e.g. acrylic acid or methacrylic acid ), and unsaturated carboxylic ester. Available examples of the metal used for soft ionomer include sodium, zinc, magnesium, calcium, manganese, nickel, potassium, and lithium. The resilience decreases with an increase in content of the soft ionomer. The content of the soft ionomer in the component (b) is thus preferably not greater than 50% by weight or more preferably not greater than 20% by weight based on the total weight of the component (b). The most preferable is, however, only the hard/rigid ionomer used for the component (b).

In the resin composition for the intermediate layer 2, the ratio of the content of the component (a) to the content of the component (b), that is, a/b, may be in the range of 10/90 to 80/20. The ratio of the contents is preferably 20/80 to 45/65 and more preferably 20/80 to 40/60 for the golf ball requiring the high resilience.

The resin composition for the intermediate layer 2 may include polymer components other than the component (a) of block copolymer (a) and the component (b) of ionomer (hereinafter referred to as the 'other polymer'). The other polymer may be mixed to such an extent that the sum of the contents of the component (a) and the component (b) to the total content of the polymer components in the intermediate layer 2, that is, (a+b)/total, is not less than 0.5 or preferably not less than 0.8. The most preferable is the ratio (a+b)/total of 1.0, that is, the polymer components comprising of the block copolymer (a) and the ionomer (b).

The resin composition for the intermediate layer 2 may further include a filler for regulating the specific gravity, for example, an inorganic salt, such as zinc oxide, barium sulfate, or calcium carbonate, a metal powder, such as tungsten or molybdenum, or a metal carbide, such as tungsten carbide, in addition to the polymer component. The resin composition may further include other additives generally mixed with the cover material of the golf ball, for example, antioxidants, dispersants, ultraviolet absorbers and colorants, according to the requirements.

The intermediate layer 2 is formed by curing the resin composition for the intermediate layer. The intermediate layer 2 has a thickness preferably in the range of 1 to 3 mm or more preferably 1.2 to 2.7 mm, and a Shore D hardness preferably in the range of 35 to 60 or more preferably in the range of 40 to 56.

The intermediate layer 2 may be a single layer or multiple layers having different compositions in the range that the above requirements are fulfilled.

The cover layer 3 is generally composed of a material mainly including an ionomer. The ionomer used for the cover layer 3 may be identical with the ionomer included in the resin composition for the intermediate layer 2. The ionomer included in the cover layer 3 may be a mixture of two or more different ionomers. In the event that a soft ionomer is included in the material of the cover layer 3, the content of the soft ionomer should be not greater than 50% by weight based on the total weight of the ionomer component, in order to maintain the sufficient resilience.

The material for the cover layer 3 may include a thermoplastic elastomer, which is generally used for the cover material of the golf ball, in addition to the ionomer. The thermoplastic elastomer may be a polymer having a hard segment (referred to as 'H') and a soft segment (referred to as 'S'), and those segments are combined with in a variety configuration such as H—S form, an H—S—H form, a multi-block form expressed as (H—S)n, a star form. The hard segment is a polymer block which exhibits a frozen phase or a crystalline phase at temperatures of not higher than the melting point of the thermoplastic elastomer and has its motions restricted by the hydrogen bonding. The soft segment is a flexible polymer block at temperatures of not higher than the melting point of the thermoplastic elastomer. Specific examples of the available thermoplastic elastomer include: polystyrene elastomers containing polystyrene as the hard segment and polybutadiene, polyisoprene as the soft segment, or a hydrogenated substance thereof; polyolefin elastomers containing polyethylene or polypropylene as the hard segment and butyl rubber or EPDM (ethylene/propylene/diene terpolymer) as the soft segment; polyamide elastomers containing polyamide as the hard segment and polyester or polyether as the soft segment; polyester elastomers containing polyester as the hard segment and polyether as the soft segment; polyurethane elastomers containing a polyurethane block having the urethane bonding as the hard segment and polyester or polyether as the soft segment; polybutadiene blocks modified with maleic anhydride, with epoxy group, such as, glycidyl group, or with sulfonic acid for the enhanced compatibility with the ionomer; and mixtures of two or more elastomers listed above. The non-modified thermoplastic elastomer may be mixed with a thermoplastic elastomer modified with a polar group.

Additives like colorants, antioxidants, plasticizers, dispersants and ultraviolet absorbers may further be included in the cover material, in addition to the ionomer and the thermoplastic elastomer, according to the requirements.

The material of the cover layer 3 has a Shore D hardness preferably in the range of 55 to 70 or more preferably in the range of 58 to 68.

The thickness of the cover layer 3 is preferably 1 to 3 mm or more preferably 1.2 to 2.7 mm according to the regulation of the golf ball and the size of the core 1. The total thickness of the cover layer 3 and the intermediate layer 2 is preferably 2 to 5 mm or more preferably 2 to 4 mm.

The solid golf ball of the present invention is manufactured using conventional method. One method includes the steps of first vulcanizing a core composition to form the core 1 and then covering the core 1 with the intermediate layer 2 and further with the cover layer 3. The process of injection molding may be applied to cover the core 1 with the intermediate layer 2 and the cover layer 3. An alternative method includes the steps of molding a half shell in advance and heat pressing the core 1 covered with the intermediate layer 2 in the half shell.

A large number of dimples are formed on the surface of the cover layer 3, and the finishing with a paint and the marking complete a final product having the good appearance and the favorable commercial value.

The three-piece golf ball manufactured in the above manner has the amount of deformation in the range of 2.5 to 4.5 mm, specifically in the range of 2.8 to 4 mm, or more specifically in the range of 3.2 to 3.8 mm when applied with a load ranging from 10 kgf as an initial load to 130 kgf as a final load. The other properties may be specified adequately according to the regulation of the golf ball.

EXAMPLES

The present invention is further illustrated by the following examples. It is to be understood that the present invention is not limited to the examples, and various changes and modifications may be made in the invention without departing from the spirit and scope thereof.

Measurement and Evaluation (1) Shore D hardness

Heat-pressed sheets of the composition for the intermediate layer or the cover layer, each having a thickness of about 2 mm, were left at 23° C. for 2 weeks and measured for the Shore D hardness in accordance with ASTM D-747.

(2) Compression (mm)

The deformation amount (mm) of each golf ball was measured when a load was exerted to the golf ball from 10 kgf as an initial load to 130 kgf as a final load.

(3) Carry (yards)

A W#1 driver with a metal head was attached to a swing robot manufactured by True Temper Co., Ltd. to hit each golf ball at a head speed of 45 m/s. The carry to the falling point of the golf ball was measured.

(4) Shot Feeling

Twenty golfers having the head speed of 35 to 45 m/s actually hit each golf ball with the W#1 driver and evaluated the shot feeling according to the criteria given below. The evaluation level having the greatest number of golfers was specified as the shot feeling of the golf ball.

o: good with small impact

Δ: fair

X: poor with large impact (5) Resilience

Each golf ball was collided against an aluminum cylinder at an initial velocity of 45 m/second. The coefficient of resilience of the golf ball was determined according to the velocities of the aluminum cylinder and the golf ball before and after the collision and the weights of the cylinder and the golf ball. The greater measurement value shows the higher resilience.

Manufacture of Golf Balls

A rubber composition was molded at 160° C. for 20 minutes to a solid core, a resin composition was injection molded over the solid core to form an intermediate layer, and further a resin composition was injection molded over the intermediate layer to form a cover layer, thereby completing a golf ball.

Two different cores A and B were provided using the rubber compositions specified in Table 1, and three different cover layers a, b, and c were provided using the resin compositions specified in Table 2.

Golf balls No. 1 to No. 12 were manufactured by combining the different cores with the different cover layers and changing the resin composition of the intermediate layer as specified in Table 3. The golf balls No. 1 to No. 6 using the resin composition of the intermediate layer, which contains HG 252 as the component (a), are examples of the present invention, and the golf balls No. 7 to No. 12 are comparative examples.

The weight, the compression, the coefficient of restitution, the carry, and the shot feeling were measured and evaluated for the respective golf balls No. 1 to No. 12. The hardness was also measured for the intermediate layer material and the cover layer material. The results of the measurement and the evaluation are shown in Table 3.

The ionomers applied for the cover layer and the intermediate layer were SURLYN 8945 (the trade name of an ionomer resin composed of ethylene/methacrylic acid copolymer neutralized with sodium ion, the Shore D hardness of 63, the flexural modulus of 270 MPa), SURLYN 9945 (the trade name of an ionomer resin composed of ethylene/methacrylic acid copolymer neutralized with zinc ion, the Shore D hardness of 61, the flexural modulus of 220 MPa), and SURLYN 8320 (the trade name of an ionomer resin composed of ethylene/methacrylic acid/n-butyl acrylate terpolymer neutralized with sodium ion, the Shore D hardness of 37, the flexural modulus of 29 MPa) manufactured by Du Pont Co., Ltd., and HIMILAN 1855 (the trade name of an ionomer resin composed of ethylene/methacrylic acid/isobutyl acrylate terpolymer neutralized with zinc ion, the Shore D hardness of 54, the flexural modulus of 87 MPa) manufactured by Mitsui Du Pont Polychemical Co., Ltd.

SEPTON HG 252 (the trade name of a block copolymer manufactured by KURARAY Co., Ltd.) was applied for the component (a) of the intermediate layer of the examples according to the present invention. This is a block copolymer obtained by hydrogenating the block copolymer of polystyrene block—isoprene/butadiene random copolymer block—polystyrene block—OH and has a JIS-A hardness of 80 and a styrene content of 30%. DYNARON E 6200P (the trade name of a block copolymer manufactured by JSR Co., Ltd.) was applied for the block copolymer of the intermediate layer of the comparative examples. This does not contain an aromatic vinyl polymer block and is a block copolymer of polyethylene block—ethylene/butylene random copolymer block—polyethylene block and has a JIS A hardness of 85.

The thermoplastic elastomers used for the cover layer were PEBAX 2533 (the trade name of a polyether amide thermoplastic elastomer manufactured by ATOCHEM CORP., the Shore D hardness of 25) and EPOFRIEND A1010 (the trade name of an epoxy group-containing polystyrene—polybutadiene—polystyrene block copolymer manufactured by DAICEL CHEMICAL INDUSTRIES, LTD., the JIS-A hardness of 67, the epoxy equivalent of 1000).

TABLE 1

| | Cores | A | B |
|---|---|---|---|
| Compositions | Polybutadiene | 100 | 100 |
| | Zinc acrylate | 26 | 26 |
| | Zinc oxide | 31 | 17 |
| | Dicumyl peroxide | 0.6 | 0.6 |
| | Diphenyl disulfide | 1.0 | 1.0 |
| | Compression (mm) | 4.6 | 4.8 |

TABLE 2

| | Covers | a | b | c |
|---|---|---|---|---|
| Compositions | SURLYN 8945 | 40 | 40 | 50 |
| | SURLYN 9945 | 30 | 40 | — |
| | HIMILAN 1855 | 30 | — | 50 |
| | PEBAX2533 | — | 10 | — |
| | A1010 | — | 10 | — |
| | Titanium oxide | 4 | 4 | 4 |
| Hardness (Shore D) | | 60 | 59 | 57 |
| Thickness (mm) | | 1.6 | 1.6 | 1.6 |

TABLE 3

| No. | 1 | 2 | 3 | 4 | 5 | 6 | 7 | 8 | 9 | 10 | 11 | 12 |
|---|---|---|---|---|---|---|---|---|---|---|---|---|
| Cores | A | A | A | A | A | B | A | A | A | A | A | A |
| Covers | a | a | b | a | a | a | a | a | a | c | a | a |
| Intermediate Layer | | | | | | | | | | | | |
| SURLYN 8945 | 40 | 30 | 30 | 20 | 10 | 30 | 30 | — | — | 50 | 50 | 30 |
| SURLYN 9945 | 40 | 30 | 30 | 20 | 10 | 30 | 40 | 50 | 30 | 50 | 50 | 30 |
| SURLYN 8320 | — | — | — | — | — | — | 30 | 50 | 70 | — | — | — |
| HG-252 | 20 | 40 | 40 | 60 | 80 | 40 | — | — | — | — | — | — |
| DYNARON E6200P | — | — | — | — | — | — | — | — | — | — | — | 40 |
| Tungsten | — | — | — | — | — | 35 | — | — | — | — | — | — |
| Hardness (Shore D) | 56 | 51 | 51 | 46 | 40 | 52 | 57 | 54 | 45 | 63 | 63 | 50 |
| Thickness (mm) | 1.6 | 1.6 | 1.6 | 1.6 | 1.6 | 1.6 | 1.6 | 1.6 | 1.6 | 1.6 | 1.6 | 1.6 |
| Ball Properties | | | | | | | | | | | | |
| Weight (g) | 45.4 | 45.4 | 45.4 | 45.4 | 45.4 | 45.4 | 45.4 | 45.4 | 45.4 | 45.4 | 45.4 | 45.4 |
| Compression (mm) | 3.2 | 3.4 | 3.3 | 3.6 | 3.8 | 3.5 | 3.1 | 3.5 | 3.7 | 3.0 | 2.9 | 3.3 |
| Coefficient of Restitution | 0.774 | 0.770 | 0.772 | 0.769 | 0.767 | 0.773 | 0.764 | 0.762 | 0.760 | 0.763 | 0.767 | 0.761 |
| Carry (yards) | 232 | 230 | 231 | 229 | 228 | 232 | 225 | 223 | 222 | 223 | 227 | 223 |
| Shot Feeling | ○ | ○ | ○ | ○ | ○ | ○ | ○ | ○ | ○ | X | X | ○ |

The golf balls No. 10 and No. 11 apply only a hard ionomer (SURLYN 8945 and SURLYN 9945) for the intermediate layer. These golf balls No. 10 and No. 11 have poor shot feeling, irrespective of the compression of the golf ball. Changing the cover to lower the compression of the golf ball does not improve the shot feeling.

The golf balls No. 7 to No. 9 apply different combinations of the hard ionomer and the soft ionomer for the intermediate layer to decrease the hardness of the intermediate layer, while using the same cover layer. Although these golf balls No. 7 to No. 9 have the good shot feeling, the carry of the golf ball decreases with an increase in content of the soft ionomer. The satisfactory carry can not attained in the range of good shot feeling.

As clearly shown by the golf balls No. 1 to No. 5 using the component (a) of the present invention in place of the soft ionomer, a decrease in hardness of the intermediate layer with a variation of the content of the component (a) does not significantly lower the carry of the golf ball, while improving the shot feeling. Namely the examples of the present invention satisfy the contradictory requirements, that is, the good shot feeling and the excellent carry.

The comparison between the golf balls No. 2 and No. 3 shows that using the mixture of the ionomer and the thermoplastic elastomer for the cover layer further improves the carry of the golf ball. The comparison between the golf balls No. 3 and No. 6 shows that the intermediate layer with tungsten added thereto further improves the coefficient of restitution and the carry of the golf ball.

The comparison between the golf balls No. 2 and No. 12 shows that the block copolymer (a) of the present invention has more excellent resilience and the flying distance, compared with the block copolymer including a polyolefin block as the hard segment.

The solid golf ball of the present invention has an intermediate layer that is made of a composition containing a specific block copolymer (i.e. component (a)), which is flexible but effectively prevents the resilience from lowering. This arrangement enables the contradictory requirements, the excellent carry and the improved shot feeling, to be fulfilled.

The present invention has been described with reference to the present embodiments. Obviously, modifications and alterations will occur to others upon reading and understanding the proceeding detailed description. It is indeed that the present invention be construed as including all such modifications and alterations insofar as they come within the scope of the attended claims or the equivalents thereof.

What is claimed is:

1. The solid golf ball comprising:
   a core,
   a cover layer, and
   an intermediate layer disposed between said core and said cover layer, wherein said intermediate layer comprises a thermoplastic resin composition including:
      component (a) being at least one member selected from the group consisting of a first block copolymer which has at least one polymer block A of an aromatic vinyl compound and at least one polymer block B of a conjugated diene compound, and a second block copolymer obtained by hydrogenating said first block copolymer; and
      component (b) comprising at least one hard ionomer having a flexural modulus of not less than 150 MPa and a Shore D hardness of not less than 57.

2. The solid golf ball according to claim 1, wherein said component (a) has a hydroxyl group bonded to its molecular terminal.

3. The solid golf ball according to claim 2, wherein said first block copolymer is polystyrene block—polymer block of conjugated diene—polystyrene block.

4. The solid golf ball according to claim 1, wherein the content ratio of said component (a) per said component (b) ranges from 10/90 to 80/20.

5. The solid golf ball according to claim 1, wherein said first block copolymer contains 5 to 75% by weight of said polymer block A.

6. The solid golf ball according to claim 1, wherein said component (a) has a number-average molecular weight of 30,000 to 1,000,000.

7. The solid golf ball according to claim 1, wherein said component (b) has a flexural modulus of not less than 200 MPa and a Shore D hardness of not less than 60.

8. The solid golf ball according to claim 1, wherein said intermediate layer has a thickness of 1 to 3 mm.

9. The solid golf ball according to claim 1, wherein said core is made of a vulcanized rubber composition containing a base rubber, a metal salt of $\alpha,\beta$p-unsaturated carboxylic acid and a peroxide, and has an outer diameter of 32 to 38 mm and an amount of deformation of 3.0 to 6.0 mm when applied with a load from 10 kgf as an initial load to 130 kgf as a final load.

10. A solid golf ball according to claim 1, wherein said cover layer is made of a material having a Shore D hardness of 55 to 70.

11. The solid golf ball of claim 1, wherein component (b) further contains a soft ionomer, said hard ionomer being present in an amount of 50% or more by weight based on the total weight of component (b).

* * * * *